US009688319B2

(12) United States Patent
Traylor

(10) Patent No.: US 9,688,319 B2
(45) Date of Patent: Jun. 27, 2017

(54) RETRACTABLE FAIRING FOR REDUCING AERODYNAMIC DRAG AT THE REAR END OF A COMMERICAL MOTOR VEHICLE

(71) Applicant: David W. Traylor, Lakewood, CO (US)

(72) Inventor: David W. Traylor, Lakewood, CO (US)

(73) Assignee: Traylor Aerodynamic Systems, LLC, Lakewood, CO (US)

( * ) Notice: Subject to any disclaimer, the term of this patent is extended or adjusted under 35 U.S.C. 154(b) by 0 days.

(21) Appl. No.: 14/872,883

(22) Filed: Oct. 1, 2015

(65) Prior Publication Data

US 2016/0096559 A1 Apr. 7, 2016

Related U.S. Application Data

(60) Provisional application No. 62/058,435, filed on Oct. 1, 2014.

(51) Int. Cl.
*B62D 35/00* (2006.01)

(52) U.S. Cl.
CPC .......... *B62D 35/001* (2013.01); *B62D 35/007* (2013.01)

(58) Field of Classification Search
CPC .................................................... B62D 35/001
USPC ...................................................... 296/180.4
See application file for complete search history.

(56) References Cited

U.S. PATENT DOCUMENTS

| 4,236,745 | A | * | 12/1980 | Davis | B62D 35/004 |
| | | | | | 105/1.1 |
| 6,309,010 | B1 | | 10/2001 | Whitten | |
| 6,666,498 | B1 | | 12/2003 | Whitten | |
| 6,685,256 | B1 | | 2/2004 | Shermer | |
| 6,959,958 | B2 | | 11/2005 | Basford | |
| 7,093,889 | B2 | | 8/2006 | Graham | |
| D595,195 | S | | 6/2009 | Fitzgerald | |

(Continued)

OTHER PUBLICATIONS

"DOE's Effort to Improve Heavy Vehicle Aerodynamics through Joint Experiments and Computations", DOE Annual Merit Review, Project ID #VSS006, May 13-17, 2013, 25 pp.

(Continued)

*Primary Examiner* — Glenn Dayoan
*Assistant Examiner* — Dana Ivey
(74) *Attorney, Agent, or Firm* — James A. Sheridan; Sheridan Law, LLC

(57) ABSTRACT

A retractable fairing for reducing aerodynamic drag at a rear end of a commercial motor vehicle (CMV) may comprise a streamlining element having a medial plane and an airflow surface for streamlining air flow. A suspension frame may have an element end for hingedly supporting the streamlining element at approximately the medial plane and may have a trailer end for hingedly mounting the suspension frame to approximately an outer vertical corner of the rear end and may include a trailer hinge allowing the streamlining element to move in a horizontal plane into a folded position adjacent to the rear end. A pair of streamlining elements of complementary shape may be each mounted by a suspension frame to respective left and right halves of the rear end and placed in the folded position, the medial planes of each element facing one another and the streamlining elements collectively forming the retractable fairing.

24 Claims, 13 Drawing Sheets

(56) References Cited

U.S. PATENT DOCUMENTS

| | | | |
|---|---|---|---|
| 7,641,262 B2 * | 1/2010 | Nusbaum | B62D 35/001 296/180.5 |
| 7,740,304 B1 | 6/2010 | Breu | |
| 7,984,920 B2 | 7/2011 | Alguera | |
| 8,196,996 B1 | 6/2012 | Campbell | |
| 8,322,778 B1 | 12/2012 | Pfaff | |
| 8,342,595 B2 | 1/2013 | Henderon et al. | |
| 8,376,450 B1 | 2/2013 | Long et al. | |
| 8,480,161 B2 | 7/2013 | Pfaff | |
| 9,039,069 B2 | 5/2015 | Smith et al. | |
| 2009/0212594 A1 | 8/2009 | Breidenbach | |
| 2011/0148142 A1 | 6/2011 | Kint | |
| 2011/0304173 A1 | 12/2011 | Breidenbach | |
| 2012/0001451 A1 | 1/2012 | Breidenbach | |
| 2013/0038086 A1 | 2/2013 | Breidenbach | |
| 2013/0088040 A1 | 4/2013 | Pfaff | |
| 2013/0181479 A1 | 7/2013 | Smith | |

OTHER PUBLICATIONS

Abbarau, Nanda Kishore, "Sending and Receiving Data Between Mobile and Data Logger", Tekniska Hogskolan, 58 pp.
Curry, Thomas, et al., "Reducing Aerodynamic Drag & Rolling Resistance from Heavy-Duty Trucks: Summary of Available Technologies & Applicability to Chinese Trucks", M.J. Bradley & Associates, LLC, Oct. 2012, 33 pp.
Delgrossi, Luca, Ph.D., "The Future of the Automobile Vehicle Safety Communications", Stanford University, Apr. 8, 2014, 57 pp.
"Using Bluetooth for Data Communications in Industrial Automation", Digi-Key Electronics, www.digikey.com, 2015, 5 pp.
Giles, Tim, "A Smooth Ride", Global Trailer, www.globaltrailermag.com, Sep.-Oct. 2011, p. 39-43.
Hakansson, Christoffer, et al., "CFD Analysis of Aerodynamic Trailer Devices for Drag Reduction of Heavy Duty Trucks", Master's Thesis in the Master's Programme Automotice Engineering, Dept. of Applied Mechanics, Division of Vehicle Engineering and Autonomous Systems, Chalmers University of Technology, Goteborg, Sweden, 2010, 77 pp.
Leuschen, Jason, et al., "Full-Scale Wind Tunnel Tests of Production and Prototype, Second-Generation Aerodynamic Drag-Reducing Devcies for Tractor-Trailers", National Research Council, Ottawa, Canada, 2006, 8 pp.
Ortega, J., et al., "Aerodynamic Drag Reduction of Class 8 Heavy Vehicles: A Full-Scale Wind Tunnel Study" Lawrence Livermore National Laboratory, Nov. 28, 2012, 51 pp.
Patten, Jeff P., et al., "Review of Aerodynamic Drag Reduction Devices for Heavy Trucks and Buses", Centre for Surface Transportation Technology, Ottawa, Canada, May 11, 2012, 120 pp.
Sharpe, Ben, et al., "Costs and Adoption Rates of Fuel-Saving Technologies for Trailers in the North American On-Road Freight Sector", The International Council on Clean Transportation, www.theicct.org, Feb. 2014, 22 pp.
Sims, Bradford W., et al., "Aerodynamic Bicycle Helmet Design Using a Truncated Airfoil with Trailing Edge Modifications", University of Colorado Denver, Department of Mechanical Engineering, 2011, 10 pp.
"Fuel-Efficient Active Flow Control for Tractor Trailers" ATDynamics, Inc., Oct. 28, 2011, 30 pp.

* cited by examiner (TOP VIEWS)

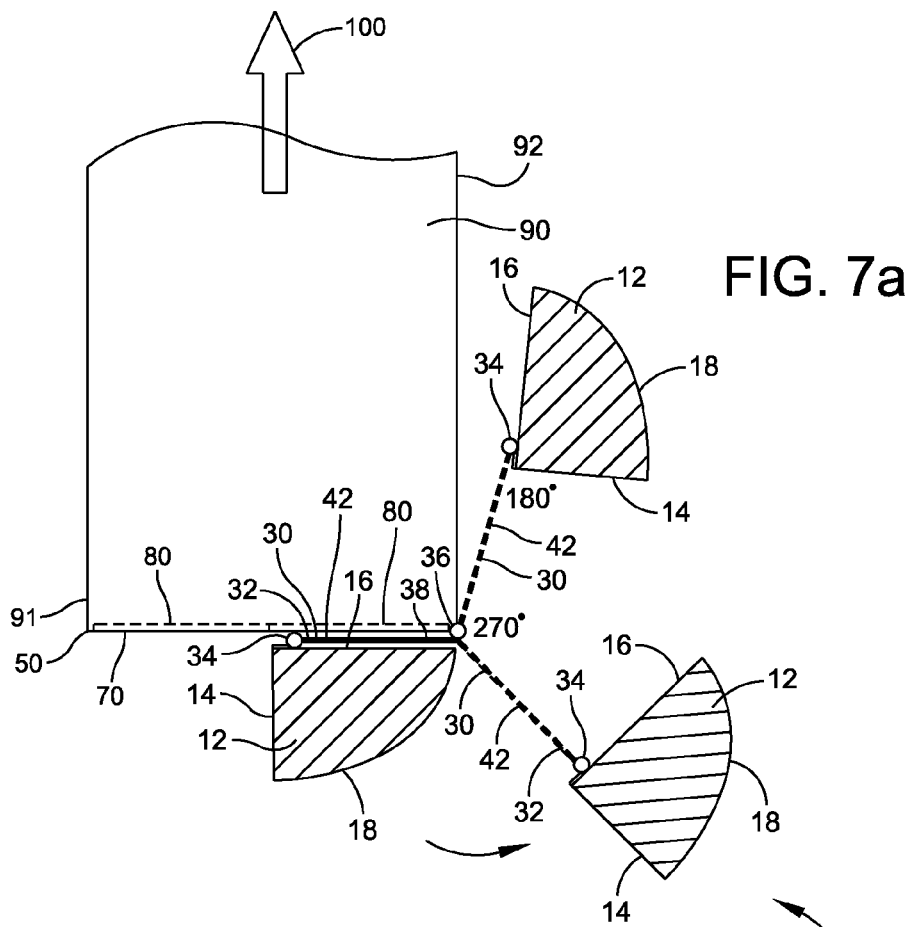
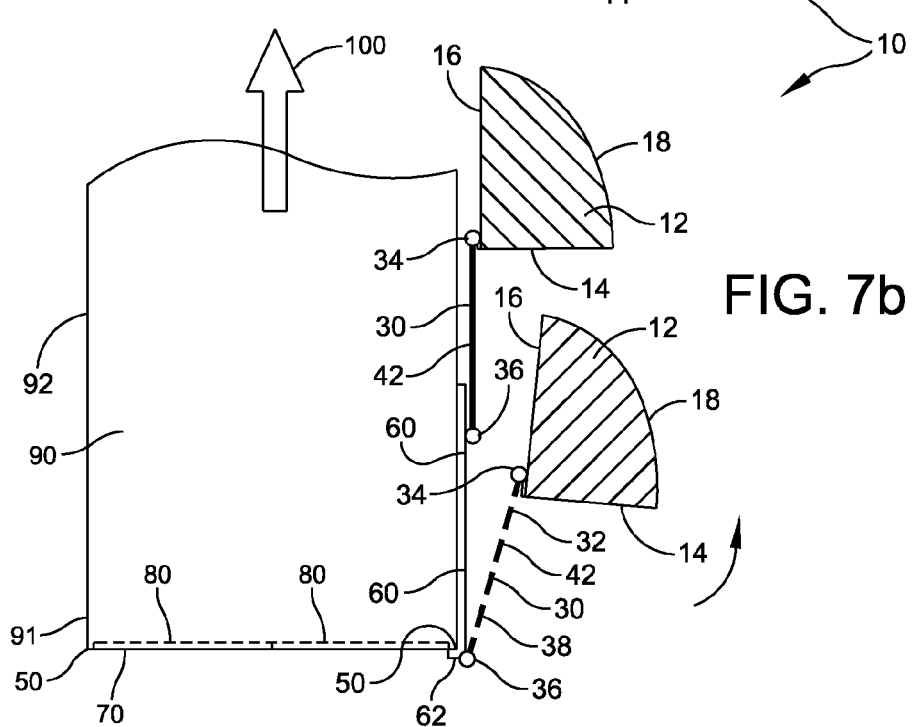

(TOP SECTIONAL VIEW)

(REAR VIEW)

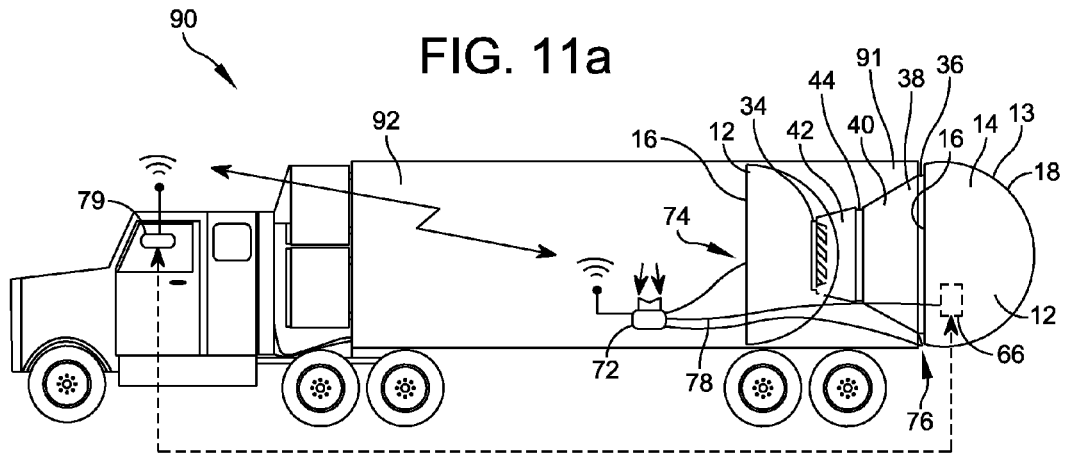
FIG. 11a
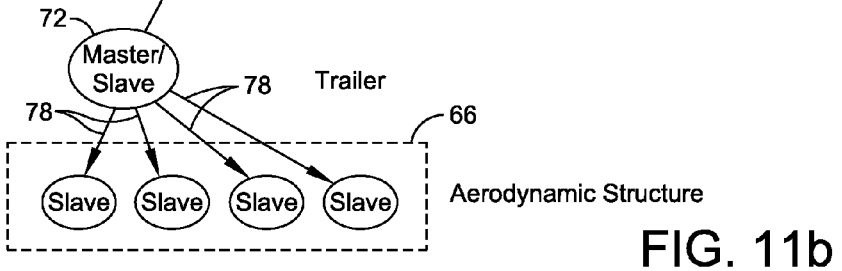
FIG. 11b
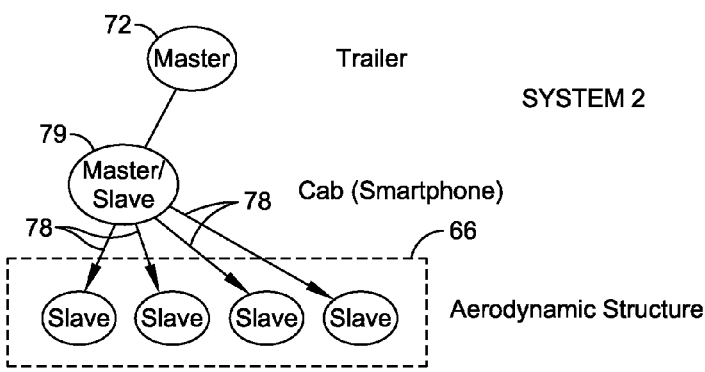

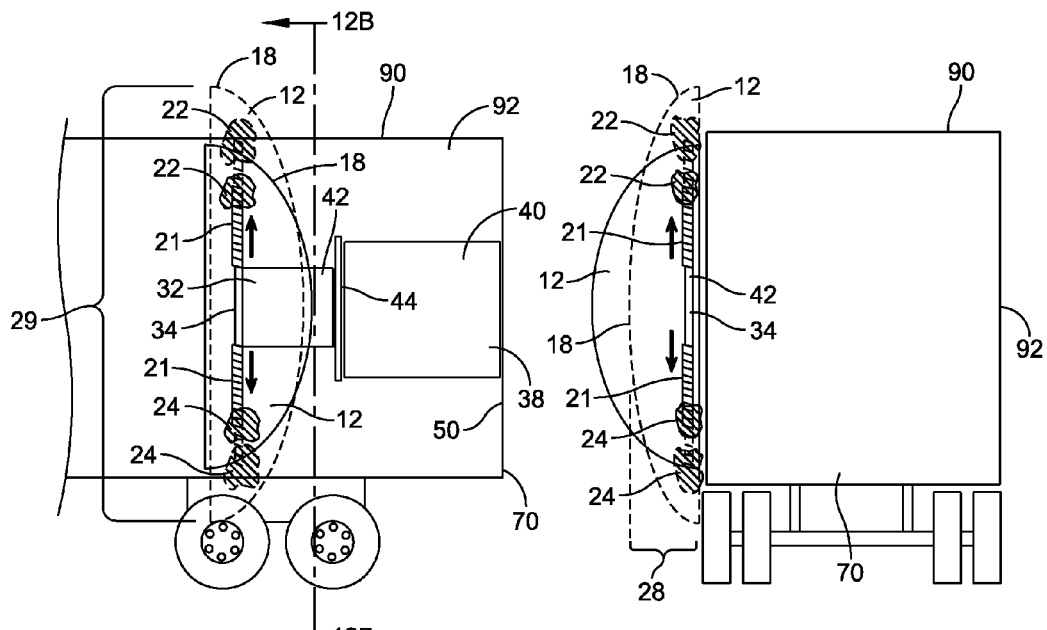
FIG. 12a
FIG. 12b
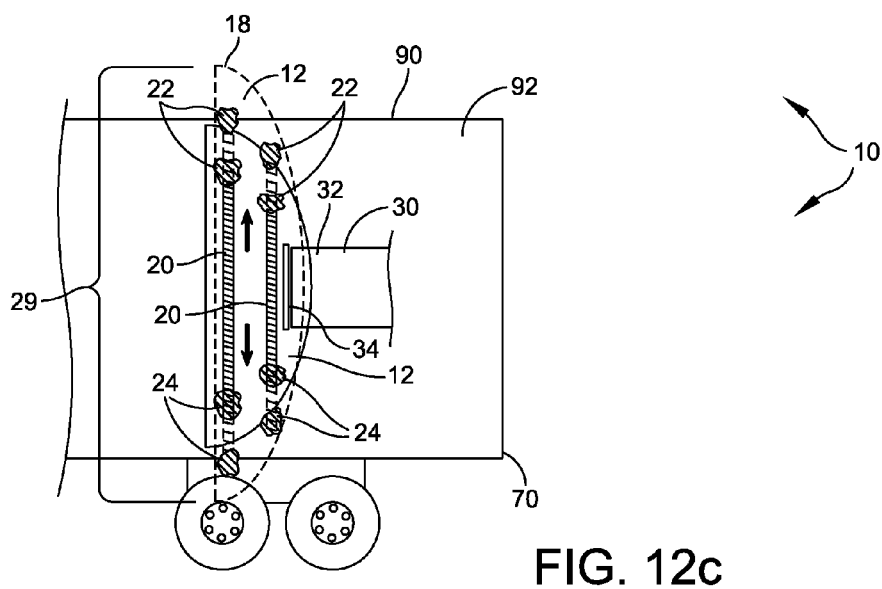
FIG. 12c

RETRACTABLE FAIRING FOR REDUCING AERODYNAMIC DRAG AT THE REAR END OF A COMMERICAL MOTOR VEHICLE

CROSS-REFERENCE TO RELATED APPLICATIONS

The present application claims priority to U.S. Provisional Application No. 62/058,435 filed on Oct. 1, 2014 and entitled EXTENDABLE FAIRING FOR REDUCING DRAG ON LARGE TRANSPORT VEHICLES, the entire contents of Application 62/058,435 being expressly incorporated by reference herein.

BACKGROUND

Over a million tractor-trailers transport goods and materials on U.S. highways at speeds of 55-75 mph, consuming fuel in the tens of billions of gallons per year and contributing to greenhouse gas emissions. Most of the fuel consumed at highway speeds is spent to overcome aerodynamic drag that occurs at the leading edge, trailing edge, and undercarriage of the tractor-trailer or other commercial motor vehicle (CMV). Aerodynamic hoods, gap fairings, and side trailer skirts have been deployed to reduce some of the drag. However, aerodynamic fairings have not been generally deployed at the rear end of such vehicles which typically have a blunt rear end with cargo doors. Also, commercial motor vehicles (CMV) such as passenger buses, vehicles carrying hazardous waste, and vehicles with gross weights of over 5 tons suffer from substantial rear end drag.

One solution to aft drag is the boat tail fairing, constructed of three or four flat panels hinging at the rear corners of a cargo door and angling in, rounding the rear end of the CMV and smoothing air flow somewhat. The back end of the fairing is generally open. However, a hinge and several stabilizer struts must be mounted to each cargo door, restricting access to the cargo door and complicating installation and use. The panels must be folded in for the cargo doors open toward the vehicle side surfaces. Additionally, the open/blunt end causes vortices and unresolved turbulence.

Another solution lowers aft turbulence via a closed-end pyramidal fairing made of panels angling inwardly. The panels are mounted to a frame attached by straps or hinging links to the top and bottom edges of the rear end. A scissors mechanism for holding the shape of an airflow surface may be folded and stowed for accessing the cargo door. In some cases, the entire fairing may be swung out from one side hinge to allow a cargo door to open against that side of the CMV. Unfortunately, the scissors mechanism is heavy and complex to fold and then stow. Additionally, door hinges may need to be replaced with wide-throw hinges to make room behind the cargo door for the folded fairing. Also, the amount of side clearance needed to swing the fairing toward the vehicle side surface is approximately the same as the trailer width, which is typically 102 inches.

Other solutions avoid complex mounting structures by frictionally attaching pyramidal or conical fairings to the rear end of the CMV. However, these fairings may require direct removal by more than one person, and may not be safely attached to the trailer. Additionally, snow and ice may accumulate on the flat surfaces and sharp corners of prior art fairings, making operation difficult or impossible due to obstruction, and potentially posing a hazard for other vehicles by dropping snow and ice onto the roadway.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is disclosed a retractable fairing for reducing aerodynamic drag at a rear end of a commercial motor vehicle (CMV) and which may comprise a streamlining element having an airflow surface with a medial edge defining an element medial plane. The airflow surface may streamline air flowing past an aft portion of a vehicle side surface of the CMV. A suspension frame may have an element end and a trailer end. The element end may be configured to hingedly support the streamlining element at approximately the element medial plane. The trailer end may be configured for hingedly mounting the suspension frame to approximately an outer vertical corner of the rear end and may include a trailer hinge allowing the streamlining element to move in a horizontal plane into a folded position adjacent to the rear end of the CMV. The streamlining element may be configured such that when a pair of streamlining elements of complementary shape are each mounted by a suspension frame to a respective left and right half of the rear end and are each placed in the folded position, the element medial plane of the streamlining elements may face one another and the streamlining elements collectively may form the retractable fairing substantially covering the rear end.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIG. 7a illustrates an exemplary embodiment of a rounded streamlining element suspended by a single suspension forearm and moving from a folded position toward a retracted position.

FIG. 7b illustrates an exemplary embodiment of a rounded streamlining element suspended by a single suspension forearm and sliding on a forwarding track to a retracted position for clearing cargo doors.

FIG. 11a-11b illustrate an exemplary embodiment of the control and sensing of the folding and retraction of a retractable fairing.

FIGS. 12a-12c illustrate an exemplary embodiment of the thinning of a streamlining element for reducing the required side clearance on a loading dock.

DETAILED DESCRIPTION

Figure 1A:
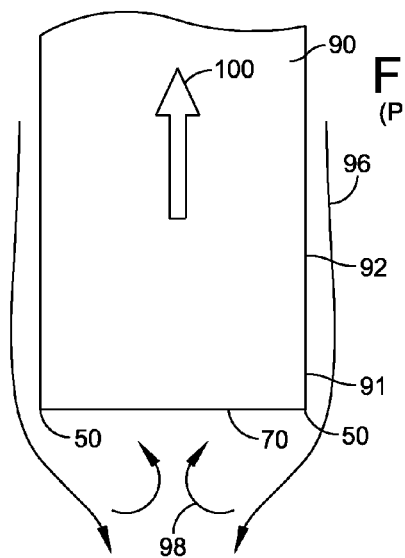
FIGS. 1a-1d illustrate the prior art showing airflow around the rear end of a commercial motor vehicle (CMV).
Figure 1B:
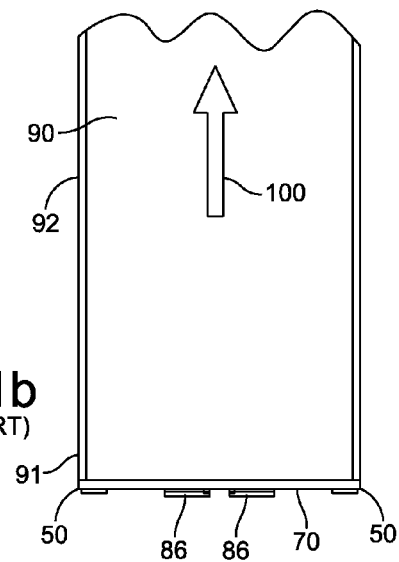
Figure 1D:
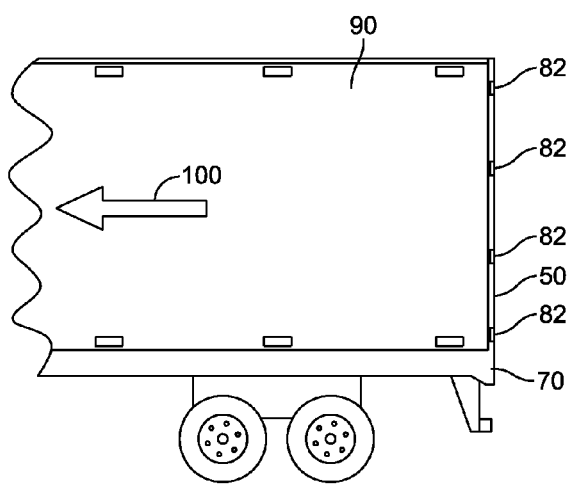
Figure 1C:
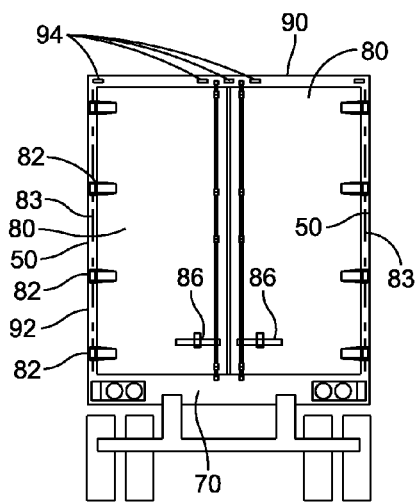

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

When elements are referred to as being "connected" or "coupled," the elements can be directly connected or coupled together or one or more intervening elements may also be present. In contrast, when elements are referred to as being "directly connected" or "directly coupled," there are no intervening elements present.

As may be appreciated, based on the disclosure, there exists a need in the art for a rear end fairing that is easily retractable for loading and unloading cargo, particularly a fairing that is not mounted to or permanently covering portions of a rear cargo door. Furthermore, there exists a need in the art for a fairing that is rounded and/or closed for reducing aerodynamic drag over that of flat panel or open fairings. Additionally, there exists a need in the art for a fairing that allows a cargo door to open 270 degrees. Also, there exists a need in the art for a fairing that has a low side profile for parking adjacently close to other commercial motor vehicles, such as on a loading dock. Finally, there exists a need in the art for sensors and remote control systems and features to automate retraction and folding to ease operation and to increase safety.

Referring to prior art FIGS. 1a-1d, airflow 96 around a typical commercial motor vehicle (CMV) 90 traveling at highway speeds generates turbulence 98 at rear end 70 after passing aft portion 91 of vehicle side surfaces 92. The blunt rear end 70 generates a vacuum and a wake of circulating turbulence 98 which causes aerodynamic drag on forward motion 100. FIGS. 1a-1d illustrate a semi-trailer portion of a tractor-trailer 90 having running lights 94. Rear end 70 includes two cargo doors 80 each mounted to the trailer frame of rear end 70 via four door hinges 82 having door hinge axes 83 near outer vertical corner 50. Cargo door 80 may be opened by accessing door handle 86. A typical trailer may have an inside width of approximately 100 inches, which means each cargo door 80 may have a width of approximately 50 inches.

CMV 90 may include passenger buses of more than 8-passenger carrying capacity, vehicles carrying hazardous waste, and vehicles with gross weights of over 5 tons, according to a US Department of Transportation definition. For the purposes of this disclosure, CMV 90 also refers to any non-personal vehicle having a blunt end and a length several times the width of the blunt end.

Referring to FIGS. 2a-9 and 11a, in various embodiments, a retractable fairing 10 for reducing aerodynamic drag at a rear end 70 of a commercial motor vehicle (CMV) 90 may comprise a streamlining element 12 having an airflow surface 18 for streamlining air flowing 96 past an aft portion 91 of a vehicle side surface 92 of vehicle 90. Airflow surface 18 may have a medial edge 13 (FIGS. 2b, 3b, 5c, 6b, 11a) defining an element medial plane 14. Suspension frame 30 (FIGS. 7a-7b) may have an element end 32 and a trailer end 38. Element end 32 may be configured to hingedly support streamlining element 12 at approximately element medial plane 14. Trailer end 38 may be configured for hingedly mounting the suspension frame to approximately an outer vertical corner 50 of the rear end 70. A trailer hinge 36 at trailer end 38 may allow streamlining element 12 to move in a horizontal plane into a folded position (FIGS. 2a, 3a, 4a, 5a, 5c, 6b, and 11a) adjacent to rear end 70. Rear end 70 may include cargo doors 80 hinged near outer vertical corner 50 by door hinges 82 having a hinge axis 83 (FIGS. 1c, 6b, 10a-10b) and openable by door handles 86.

Continuing, streamlining element 12 may be configured such that when a pair of streamlining elements 12 of complementary shape are each mounted by a suspension frame 30 to a respective left and right half of rear end 70 and are each placed in the folded position (FIGS. 4a, 5a, 5c), the element medial plane 14 of streamlining elements 12 face one another and the streamlining elements collectively form retractable fairing 10 substantially covering rear end 70. The complementary shape of the pair of streamlining elements 12 forming the retractable fairing 10 substantially covering rear end 70 comprises the pair of elements being mirror images of one another.

Referring to FIGS. 7a-7b, in an embodiment, a suspension frame 30 may comprise a suspension forearm 42 having an element end 32 and a trailer end 38, where the element end 32 may hingedly support streamlining element 12 at approximately the intersection of element medial plane 14 and element back plane 16 defined by a back edge 15 (FIGS. 2b, 3b) of airflow surface 18. Element back plane 16 may face rear end 70 when streamlining element 12 is in the folded position, and streamlining element 12 may be adjacent to vehicle side surface 92 when in the retracted position. Element end 32 may include an element hinge 34 attached to streamlining element 12 and may be configured to allow streamlining element 12 to rotate approximately 180 degrees in a horizontal plane during movement between the folded position and the retracted position. Trailer hinge 36 may be configured for at least approximately 270 degrees of rotation in a horizontal plane when streamlining element 12 is moved between the folded position and a retracted position adjacent to vehicle side surface 92. Preferably, element back plane 16 may face vehicle side surface 92 when streamlining element 12 is retracted. Alternately, element 12 may be rotated such that element medial plane 14 faces vehicle side surface 92 when retracted.

In various embodiments, referring now to FIGS. 2a-6b, 8a-9, 11a, and 12a-12c, an elbowed suspension frame 30 may comprise a suspension upper arm 40 having the trailer end 38 and a suspension forearm 42 having the element end 32. Suspension upper arm 40 and forearm 42 may be joined with an elbow hinge 44 cooperating when moving streamlining element 12 horizontally between the folded position and a retracted position adjacent to vehicle side surface 92. Element back plane 16 may face rear end 70 when streamlining element 12 is in the folded position, and streamlining element 12 may be adjacent to vehicle side surface 92 when in the retracted position. Element end 32 may include an element hinge 34 attached to streamlining element 12. Preferably, element medial plane 14 may face vehicle side surface 92 when streamlining element 12 is retracted. Alternately, element 12 may be rotated such that element back plane 16 faces vehicle side surface 92 when retracted.

In various embodiments, referring still to FIGS. 2a-6b, 8a-9, 11a, and 12a-12c, the elbowed suspension frame comprising arms 40 and 42 may be configured to retract the streamlining element 12 forward from the outer vertical corner 50 by approximately a sum of a suspension upper arm length and a suspension forearm length for clearing an open cargo door 80 configured for closing rear end 70 of CMV 90. Advantageously, each arm 40 and 42 may have a length approximately equal to the width of cargo door 80 and thus the sum may be approximately twice the width of cargo door 80, thus allowing door 80 to open a full 270 degrees.

Continuing, for example, the length of streamlining element 12 along the element medial plane 14 may be approximately 3 feet to approximately 5 feet, depending upon practicalities and public regulations, and therefore suspension forearm 42 may have a length of approximately 3-5 feet. Since cargo door 80 may have a nominal width of half the inside trailer width of 100 inches (8.3 feet), the length of forearm 42 may be approximately the same as the width of cargo door 80, and may result potentially in element 12 being retracted far forward of open cargo door 80 for easy loading and unloading of the trailer. Alternatively, element hinge 34 may be mounted centrally within element medial plane 14, retracting element 12 less but adequately forward of cargo door 80.

In various embodiments, continuing with FIGS. 2a-6b, 8a-9, 11a, and 12a-12c, elbow hinge 44 may be configured for at least approximately 90 degrees of rotation in a horizontal plane during movement between the folded and the retracted positions. In addition, element end 32 may include an element hinge 34 configured to allow streamlining element 12 to rotate approximately 180 degrees in a horizontal plane during movement between the folded position and the retracted position. Trailer hinge 36 may be configured for at least approximately 270 degrees of rotation in a horizontal plane when streamlining element 12 is moved between the folded position and a retracted position adjacent to vehicle side surface 92. In another embodiment not shown, elbow hinge 44 may be configured for at least approximately 180 degrees of rotation in a horizontal plane for the purpose of folding the suspension upper arm and forearm against each other when retracted.

Figure 8:
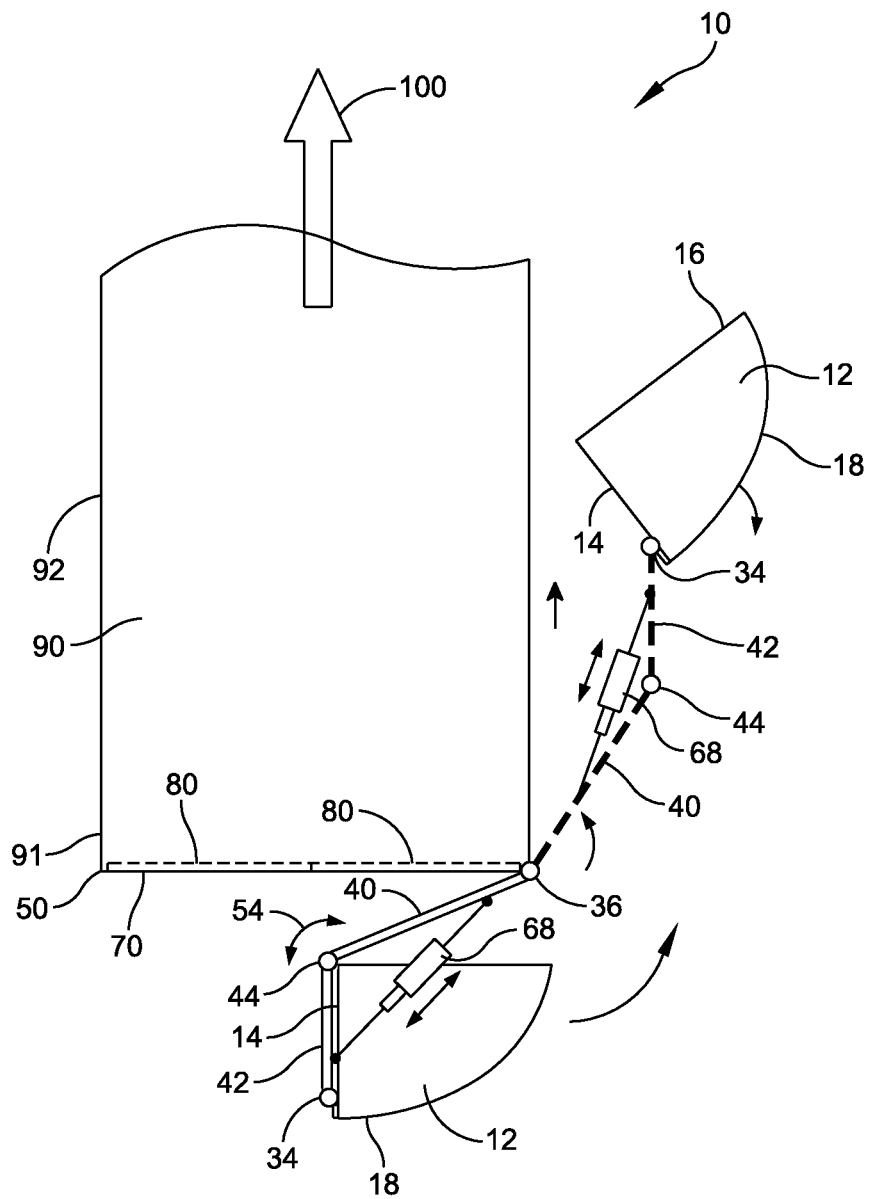
FIG. 8 illustrates an exemplary embodiment of a rounded streamlining element suspended by an elbowed suspension frame and moving into a retracted position by assistance of an elbow actuator.

In an embodiment, referring primarily to FIG. 8, an elbowed suspension frame 30 comprising arms 40 and 42 may further comprise an elbow actuator 68 attached between suspension upper arm 40 and suspension forearm 42 for effecting an angular change 54 in elbow hinge 44. Elbow actuator 68 may thereby facilitate retracting and/or folding streamlining element 12. Elbow actuator 68 may be a push-pull cylindrical actuator or a rod assembly actuated hydraulically or electrically for opening and/or closing the elbow joint. Elbow actuator 68 may comprise one or more push servos or stepper motors to effect elbow positioning, or may comprise a pneumatic screw for retracting and folding the streamlining element 12. The elbow actuator may comprise six or more servos for retracting and folding the streamlining element. The elbow joint may have a stop preventing the joint from dropping below an angle of 90 degrees, thereby prevent a damaging clamping of element 12.

Referring to FIGS. 2a-9, 11a, and 12a-12c, in various embodiments, retractable fairing 10 in the folded position combines airflow surfaces 18 which may collectively form a half-spherical shape, a paraboloid shape, a conical shape, a truncated conical shape, a pyramidal shape, or a truncated-pyramidal shape. For example, a left-sided quarter-spherical element 12 may combine with a right-sided quarter-spherical element 12 to form a half-spherical fairing 10 substantially covering and streamlining the rear end 70. Preferably, airflow surface 18 may meet vehicle side surface 92 without a corner and with less than a gap of one or two inches such that very little turbulence and drag are generated by CMV 90 traveling at highway speeds in direction 100. A spherical airflow surface 18 may be flared toward the diagonal corners of rear end 70 such that minimal cornering or gapping occurs between side surface 92 and airflow surface 18. Alternately, airflow surface 18 may not be flared toward the diagonal corners of rear end 70 for manufacturing or installation reasons. Gaps may, however, be positioned around the perimeter of element 12 near rear end 70 to allow for line-of-sight visibility to running lights 94 and other vehicle features.

Figure 5A:
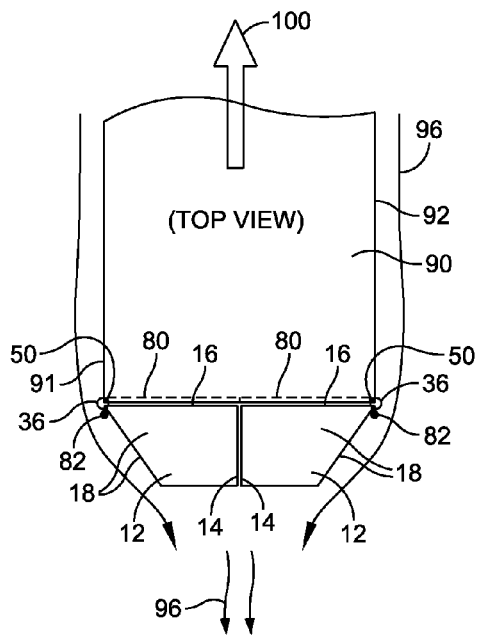
FIGS. 5a-5c illustrate an exemplary embodiment of two complementary blunt pyramidal streamlining elements in folded and retracted positions for reducing drag on a commercial motor vehicle (CMV).
Figure 5B:
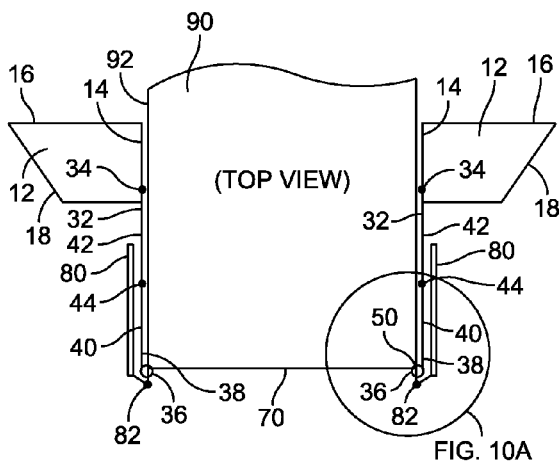
Figure 5C:
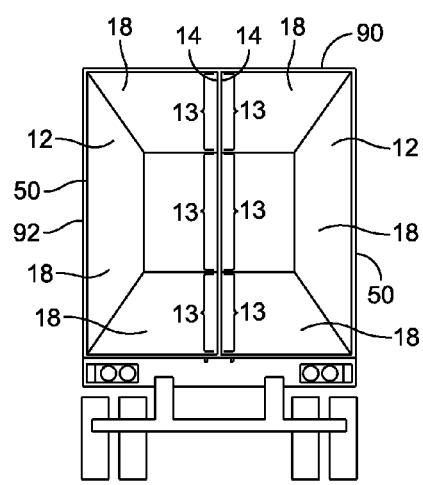

Referring still to FIGS. 2a-9, 11a, and 12a-12c, in various embodiments, streamlining element 12 may be solid and may have a rounded or a blunt end, such as a truncated pyramidal shape shown in FIGS. 5a-5c. A solid element 12 may be substantially closed in the element medial plane 14, the element back plane 12, the airflow surface 18, and other exterior surfaces, thus providing for a closed aerodynamic surface and a relatively rigid mechanical structure. For example, the truncated pyramidal fairing of FIGS. 5a-5c may be solid with medial edges 13. The interior of a solid element 12 may have some cavities for retract-fold mechanisms and clearances for cargo door hinges and other vehicle features. Advantageously, forming a solid fairing may result in reduced drag due to the lack of cavities in which turbulence can swirl. Also, a solid fairing may be mechanically stable and thus resistant to flutter and resistant to turbulence during crosswinds and may provide advantages with regards to snow and other solids accumulating. A solid fairing may be formed of at least one of metal, plastic, fiberglass, wood, carbon composite, and styrofoam coated with a hardened layer such as a wood laminate or epoxy glass.

Alternately, streamlining element 12 may be hollow and have either a rounded end, blunt end, or open end such as an open truncated conical fairing. A hollow element 12 may be substantially open in the element medial plane 14, the element back plane 12, the airflow surface 18, or in a bottom surface. The aerodynamic surface may therefore be open and rounded, closed and rounded, or closed and blunt. A hollow element 12 may be lighter than a solid fairing and may have an airflow skin 18 and a supporting interior structure. The interior of a hollow element 12 may have ample room for retract-fold mechanisms, clearances for cargo door hinges and other vehicle features, and may possess structural features that flexibly deform the airflow surface for assuming a reduced side-width dimension when in a retracted position in order to maximize clearance with adjacent vehicles parked on a loading dock (FIG. 12a-12c). A hollow fairing may be formed of at least one of metal, plastic, fiberglass, wood, carbon composite, fabric, and an elastic airflow surface material.

Figure 2A:
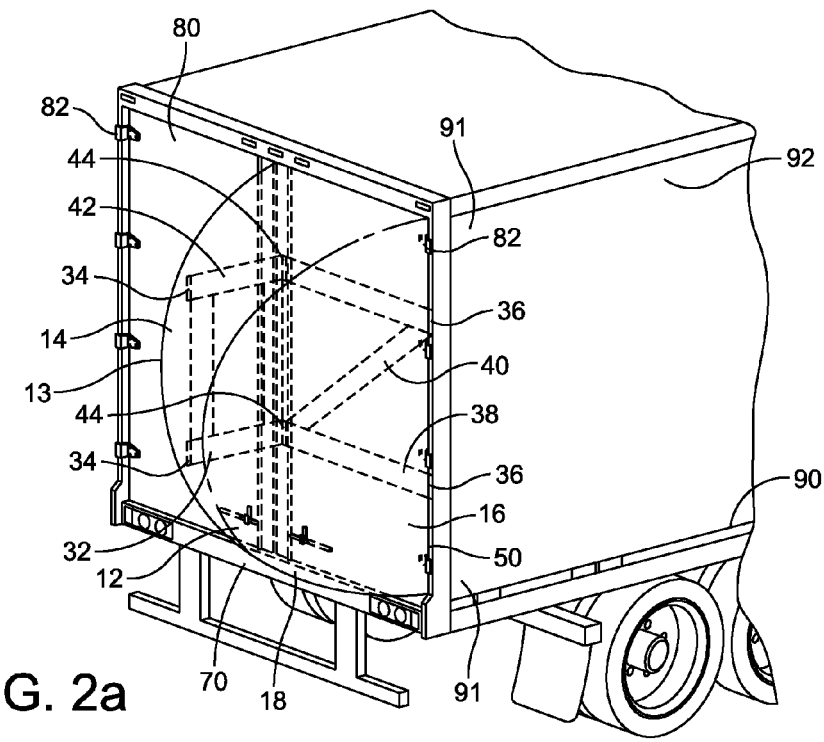
FIGS. 2a-2b illustrate an exemplary embodiment of an elbowed suspension arm suspending a rounded and closed streamlining element for reducing drag on a commercial motor vehicle (CMV), in accordance with an embodiment of the present disclosure.
Figure 2B:
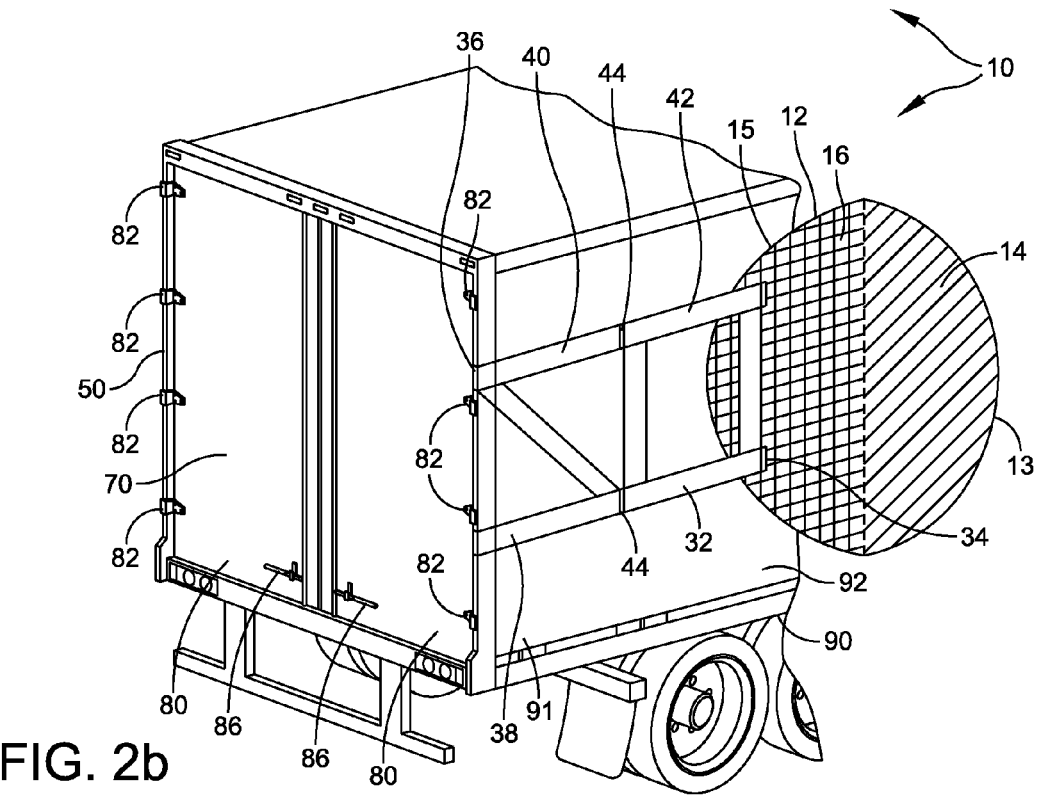
Figure 3A:
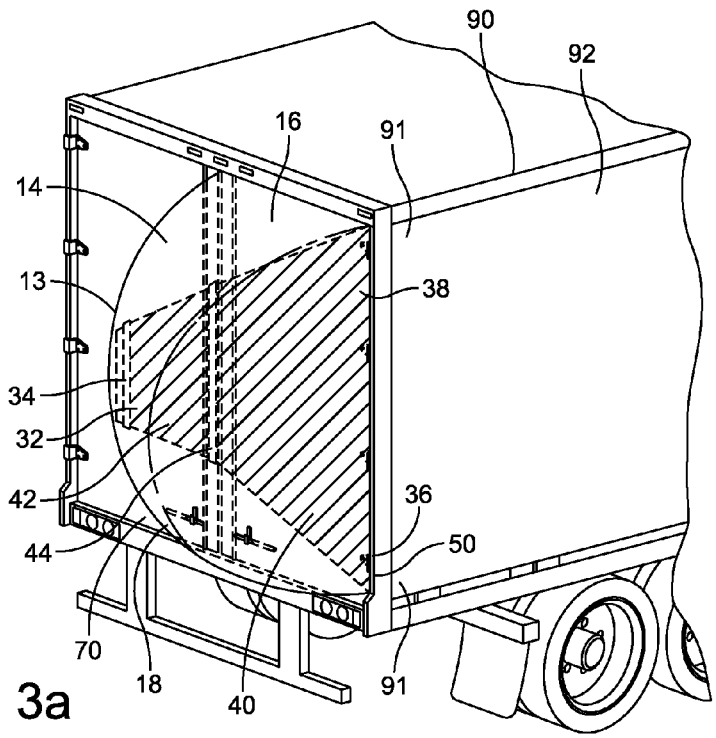
FIGS. 3a-3b illustrate an exemplary embodiment of an elbowed suspension panel suspending a rounded streamlining element for reducing drag on a commercial motor vehicle (CMV).
Figure 3B:
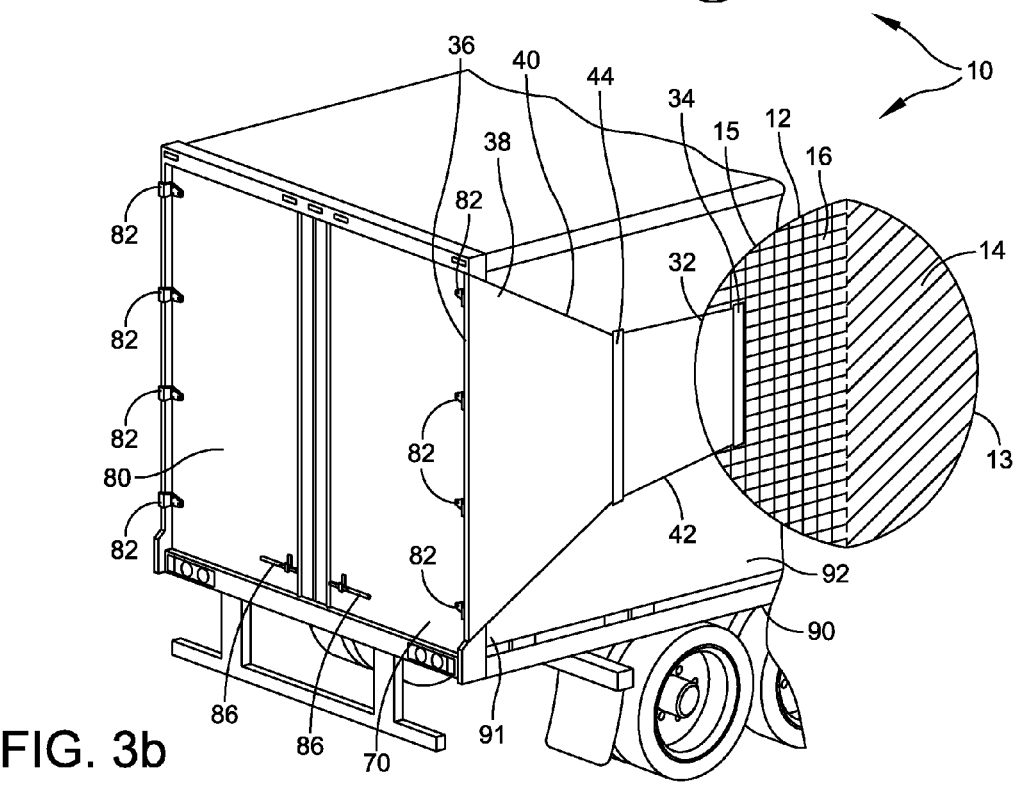
Figure 4A:
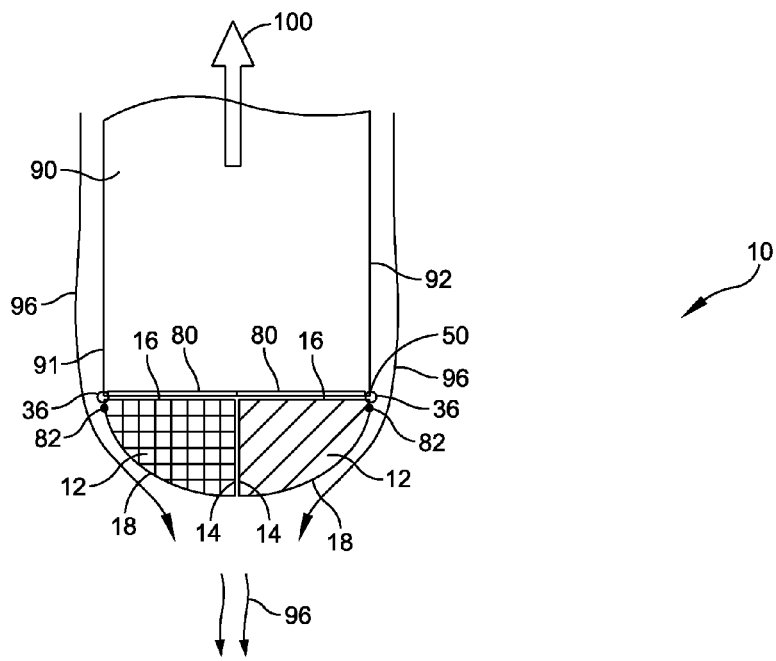
FIGS. 4a-4b illustrate an exemplary embodiment of two complementary rounded streamlining elements in folded and retracted positions for reducing drag on a commercial motor vehicle (CMV).
Figure 4B:
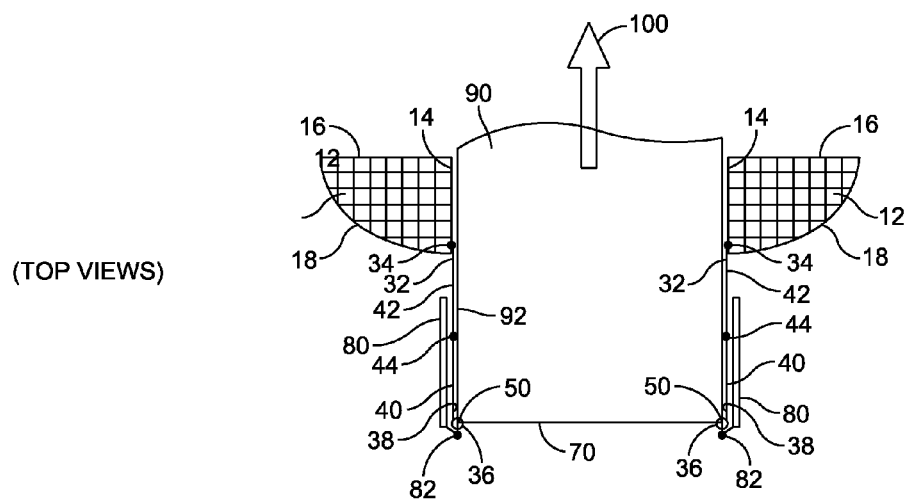
Figure 6A:
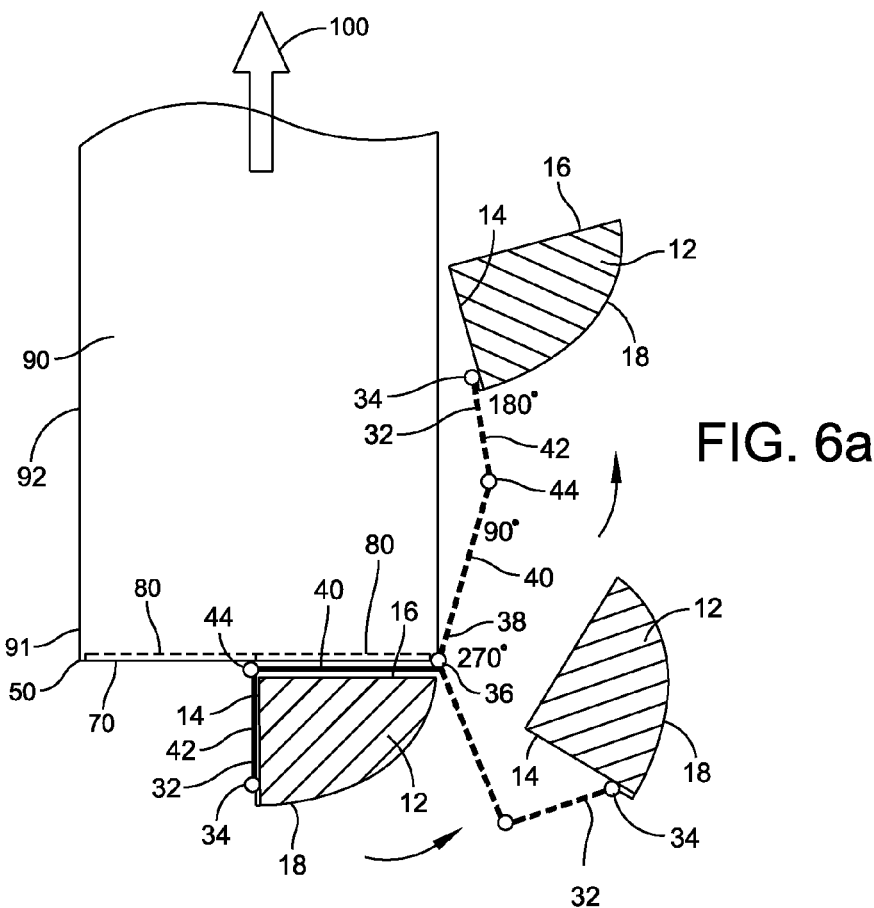
FIGS. 6a-6b illustrate an exemplary embodiment of a rounded streamlining element suspended by an elbowed suspension frame and moving from a folded position toward a retracted position.
Figure 6B:
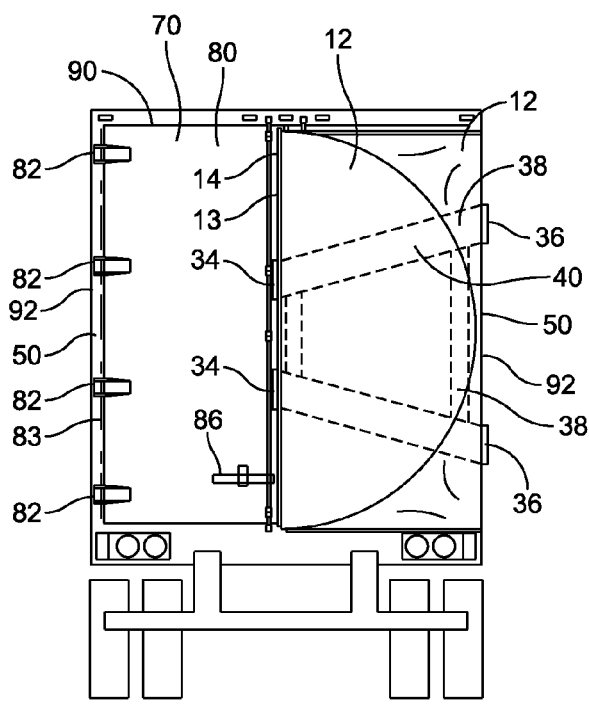

Referring now to FIGS. 2a-b and 6a, in various embodiments, suspension upper arm 40 and forearm 42 may each be a longitudinal arm, or may each comprise two or more parallel longitudinal members spaced vertically with bracing in between. The arms may be fabricated from metal, plastic, fiberglass, wood, carbon composite, or other lightweight materials. Suspension upper arm 40 and/or suspension forearm 42 may include a telescoping mechanism (not shown) for retractably extending the streamlining element forward along the vehicle side surface 92, thereby making more room for a cargo door 80 opening 270 degrees to lie along side surface 92. An elbowed suspension frame having two approximately parallel longitudinal members as shown in FIG. 2b may have attached two element hinges 34, two elbow hinges 44, and two trailer hinges 36. In another embodiment (FIGS. 7a-7b), a suspension frame 30 without an elbow and consisting of suspension forearm 42 may include a telescoping section in forearm 42 for clearing open cargo door 80.

Referring now to FIGS. 3a-b, 11a, and 12a-12b, in various embodiments, suspension upper arm 40 and forearm 42 may each be a panel. The panels may be fabricated from metal, plastic, fiberglass, wood, carbon composite, or other lightweight materials, and may contain holes or perforations to lighten the panels. Advantageously, panels may provide substantial stiffness for supporting streamlining elements 12 while being thin, and may thereby fit easily behind element medial plane 14 when in the folded position and behind open cargo door 80 when in the retracted position. For example, a spacing between an open cargo door 80 mounted with standard door hinges 82 and vehicle side surface 92 may be 2-3 inches, providing enough room for a suspension frame comprised of longitudinal members or panels.

Referring now to FIG. 6a-9, in various embodiments, retraction of the fairing 10 may be accomplished manually by first unlocking any securing mechanisms (not shown) holding elements 12 in a folded position. For example, one or more latches (not shown) may latch the right and left streamlining elements 12 together, and may be released prior to retraction. One or more latches may also latch a streamlining element 12 to rear end 70 and may be released prior to retraction. Following unlatching, elements 12 may be pulled away from rear end 70 and away from each other in an outboard direction as trailer end 38 of the suspension frame swings counterclockwise around trailer hinge 36. Element 12 may rotate clockwise around element hinge 34 as element 12 is moved forward to be adjacent to vehicle side surface 92. Preferably, element 12 may rotate 180 degrees clockwise until the desired face of element 12 faces side surface 92. In the case of an elbowed suspension frame (FIGS. 6a-b and 8-9), elbow hinge 44 may spin 90 degrees until the suspension frame is straight.

Continuing with FIG. 6a-9, in various embodiments, once retraction is completed for both sides of the vehicle 90, one or more latches may fasten the streamlining elements 12 to the vehicle side surface 92. Folding of fairing 10 may be accomplished manually by reversing the above procedure. Complimentary elements 12 may be positioned in a folded position such that the element back planes 16 face rear end 70 and such that element medial planes 14 of the left and right elements face one another for substantially covering the left and the right halves of the rear end, respectively. In other embodiments not shown, manual mechanisms, such as cranks, pulleys, or chains, may be included in retractable fairing 10 for supporting a manual retraction and/or folding of elements 12.

Figure 9:
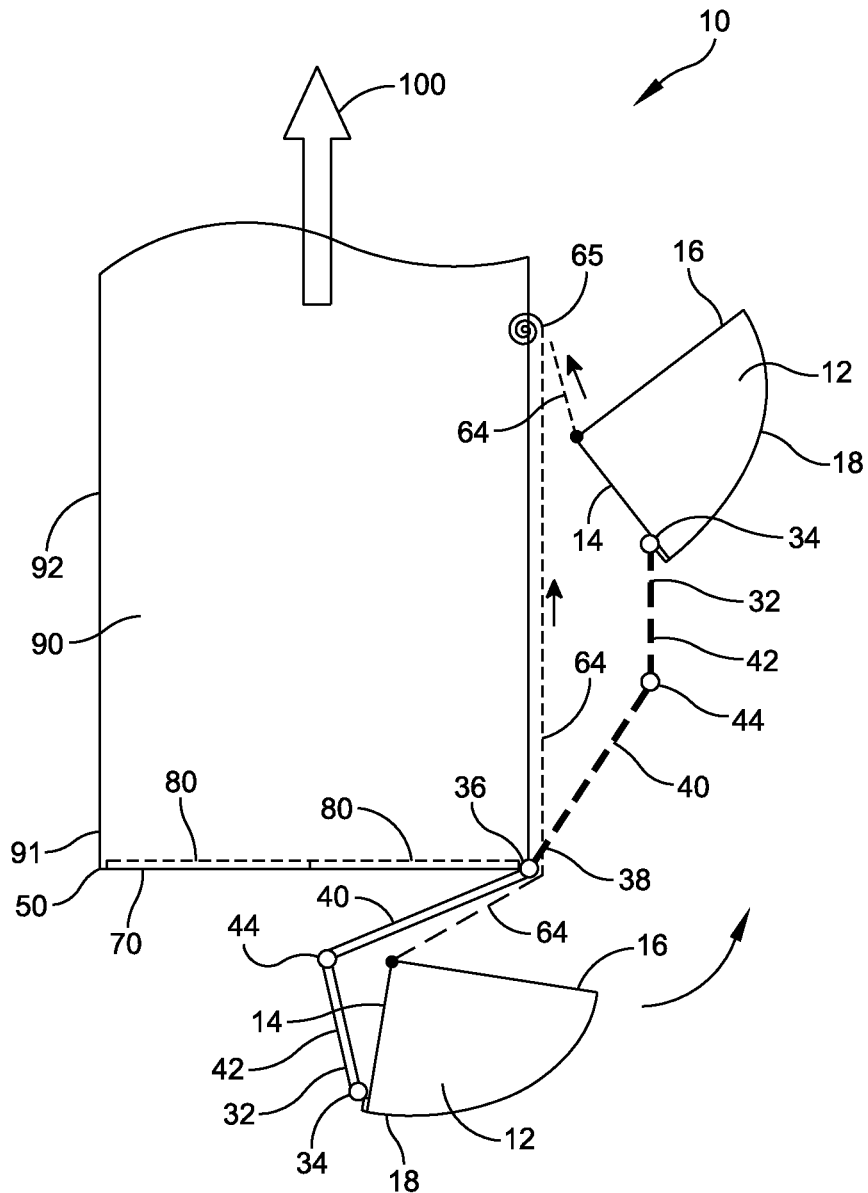
FIG. 9 illustrates an exemplary embodiment of a rounded streamlining element suspended by an elbowed suspension frame and moving into a retracted position by assistance of a retraction spool.

Referring to FIGS. 7a-7b and 9, in various embodiments, a forwarding track 60 may be oriented horizontally along vehicle side surface 92. One track end 62 of the forwarding track may be interposed between outer vertical corner 50 and trailer hinge 36. The forwarding track may suspend streamlining element 12 and may allow element 12 to slide forward along the vehicle side surface for clearing an open cargo door 80 configured for closing the rear end 70 of vehicle 90. Advantageously, forwarding track 60 may enable element 12 to clear open cargo door 80 when element hinge 34 cannot be placed directly at medial plane 14. Additionally, referring to FIG. 9, retractable fairing 10 may include a retraction spool 65 for pulling element 12 forward along vehicle side surface 92. For example, retraction spool 65 may spool a retraction cable 64 attached to streamlining element 12, and retraction mechanism 65 may pull element 12 from a folded position to a retracted position, thereby automating the retraction process.

Referring further to FIG. 6a-9, in various embodiments, forwarding track 60, retraction spool 65, and elbow actuator 68 may be combined in various combinations for automating the retraction and folding of retractable fairing 10. In addition, one or more of hinges 34, 36, and 44 may be pneumatic screw hinges for rotating the streamlining element into at least one of a folding action and a retracting action. Elbow actuator 68 may open the elbow (FIG. 8) while a retraction spool 65 (or a pneumatic trailer hinge 36) swings the suspension forearm toward side surface 92. In embodiments not shown, in the case of an elbowed suspension frame (FIGS. 6a-6b, 8-9), a corner roller may be disposed at a medial corner formed by the intersection of back plane 16 and medial plane 14. The corner roller may roll horizontally along side surface 92 to self-align element 12 while retraction occurs automatically or manually. Retraction and/or folding may be automated by combining at least one of an elbow actuator 68, a retraction spool 65, forwarding track 60, a pneumatic version of spring hinge 34, a pneumatic version of spring hinge 36, and a pneumatic version of spring hinge 44. In addition, hinges 34, 36, and 44 may be electric hinges based on servo or stepper motor actuation.

Figure 10A:
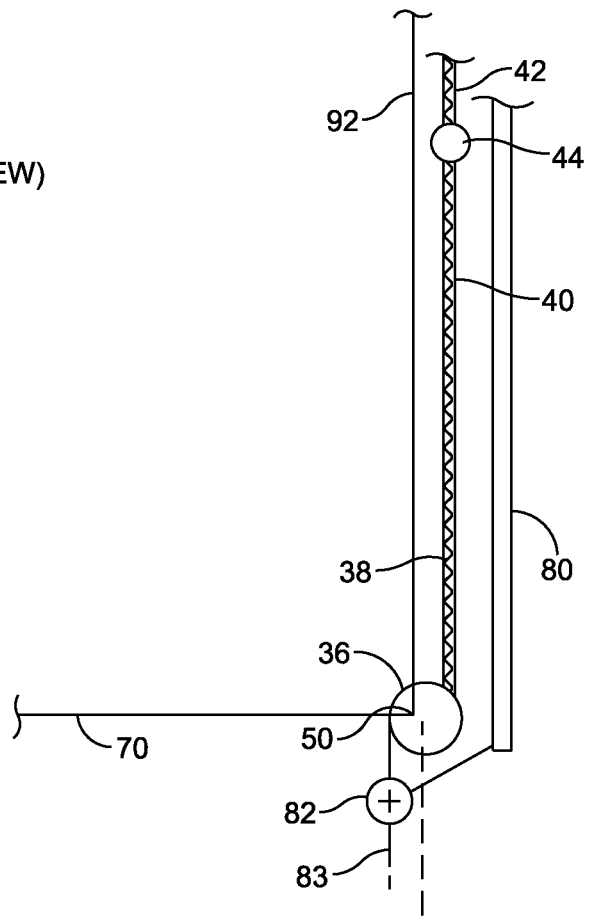
FIGS. 10-10b illustrate an exemplary embodiment of a relation between a trailer hinge and a cargo door hinge on the rear end of a CMV.
Figure 10B:
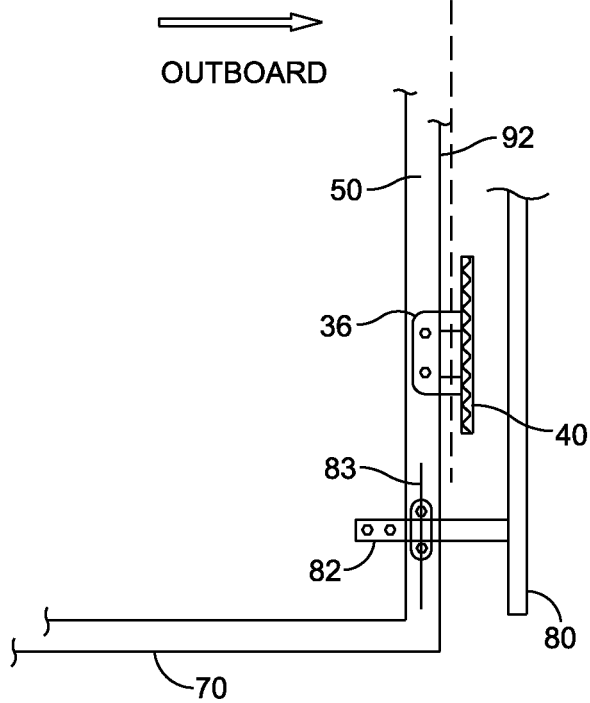

Referring now to FIG. 10a-10b, in various embodiments, a close-up of FIG. 5b may illustrate the relationship between trailer hinge 36 and cargo door hinge 82. Trailer hinge 36 may define a trailer hinge pivot axis 58 and may be configured such that when the trailer end 38 of the suspension frame (suspension upper arm 40 in FIG. 10a-10b) is hingedly mounted to approximately the outer vertical corner 50 of rear end 70, the trailer hinge pivot axis 58 may be approximately collinear with or outboard of a door hinge axis 83 of the door hinge 82 of cargo door 80. A standard cargo door hinge 82 may extend rearwardly from rear end 70 by two to three inches to create a side gap, or "throw", between opened cargo door 80 (as shown) and vehicle side surface 92. The side gap may thereby provide clearance for suspension arms 40 and 42 as well as elbow hinge 44. Door hinge 82 may be replaced with a wide-throw hinge to create additional space (e.g. 10 inches) between open cargo door 80 and side surface 92.

In various embodiments, FIGS. 11a-11b may illustrate control and sensing options for the folding and retraction processes of a retractable fairing 10 mounted to a tractor-trailer 90. A left streamlining element 12 retracted against side surface 92 and suspended by suspension panels 40 and 42 and a right streamlining element 12 folded against the rear end (not shown) may be actuated by various retract-fold mechanisms represented as box 66. Direct controller 72 may electrically, pneumatically, or wirelessly connect via retract/fold control line 78 to retract-fold mechanisms 66 for directly controlling one or more actuating mechanisms within the retractable fairing 10. The actuating mechanisms may comprise at least one of the following for moving the streamlining element between the folded position and a retracted position: an elbow actuator, a retraction spool, a forwarding track, a pneumatic spring hinge, a motorized hinge, a push servo, a stepper motor, a telescoping suspension arm, a vertically telescoping hinge, and a vertical displacement actuator (see FIG. 12a-12c).

Continuing with FIG. 11a-11b, in various embodiments, direct controller 72 may have rocker switches, toggle switches, push button controls, or other human interface controls for a driver or dock worker to initiate folding or retraction. Direct controller 72 may be positioned on the side surface 92 of the trailer, in the cab of the tractor, or a location convenient to a user. A cab controller 79 may provide remote access to retract-fold mechanisms 66 via a wired or wireless connection to direct controller 72 (System 1, FIG. 11b), or cab controller 79 may directly access retract-fold mechanisms 66 via a wired or wireless connection and also communicate with direct controller 72 (System 2, FIG. 11b). Because of the relative short distance from the cab to the rear end of the trailer, Bluetooth™ may provide a wireless interface between any of controller 79, controller 72, and mechanisms 66. Alternately, a Smart phone may serve as a remote control as cab controller 79 for communicating to direct controller 72 or to retract-fold mechanisms 66.

Referring still to FIG. 11a-11b, in various embodiments, retractable fairing 10 may include at least one of a folded sensor 76 to notifying CMV personnel of a folded condition, a retracted sensor 74 to notifying CMV personnel of a retracted condition, and a latch sensor (not shown) to notifying CMV personnel of an 'element latched' or 'element unlatched' condition. Sensors 74 and 76 may be connected to direct controller 72 or may be wirelessly linked to cab controller 79 or a remote control such as a Smart phone for notifying CMV personnel of the appropriate condition. Additionally, sensors may be built into an application in a Smart phone (not shown) for detecting a CMV 90 backing up while fairing 10 is in the folded position or detecting a CMV 90 moving forward while fairing 10 is in the retracted position. One or more sensors may communicate with the direct controller 72 through control line 78, or may communicate with remote controller 79. A speed sensor may be disposed on the CMV or contained within a remote control device. A deflection sensor (not shown) may sense when airflow surface 18 or element 12 is being deflected or compressed, as might occur when backing into a loading dock with the fairing in the folded position.

Figure 13:
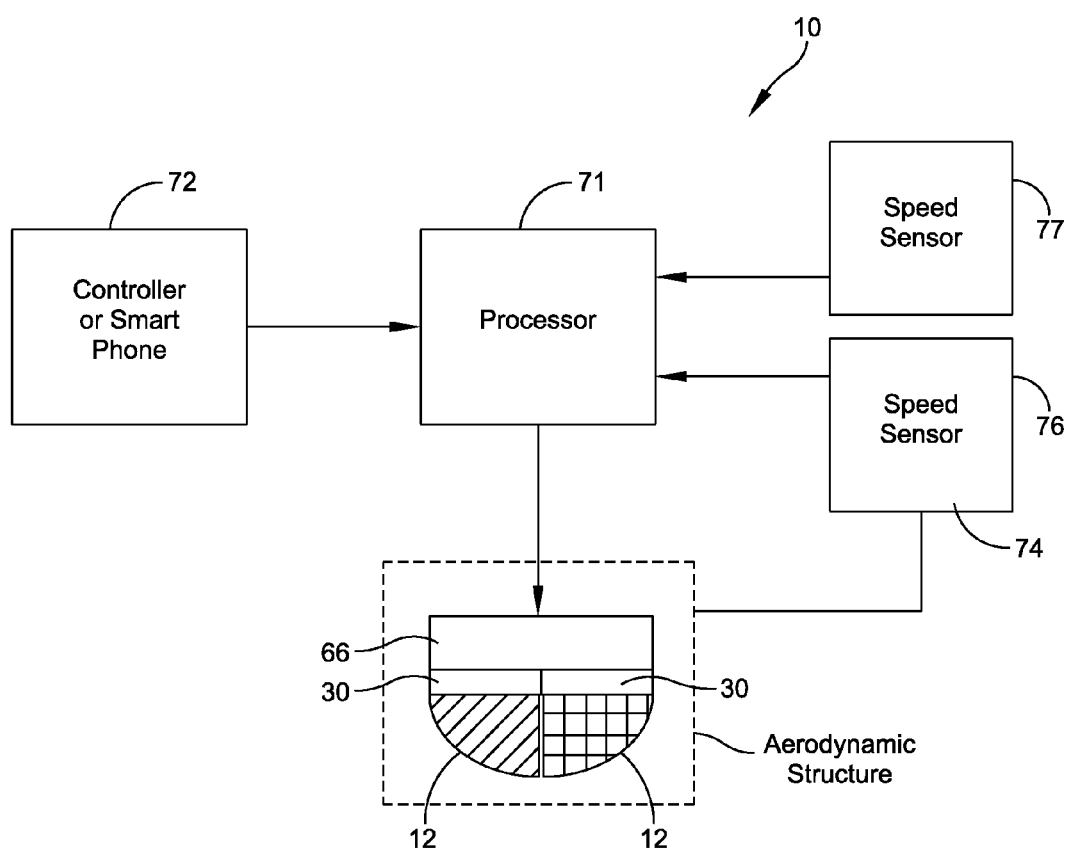
FIG. 13 illustrates an exemplary embodiment of software control of the retraction and folding actions.

Referring FIGS. 11a-11b and 13, in various embodiments, the retractable fairing may include a processor 71 with software, a retract-fold mechanism 66 connected to processor 71, and a controller 72 connected to the processor 71. The retract-fold mechanism 66 may include various actuators actuating suspension frames 30 and/or elements 12 for swinging two complementary streamlining elements 12 between a retracted position adjacent to the vehicle side surfaces 91 and the folded position. Mechanisms 66 may include at least one of the following for moving the streamlining element between the folded position and a retracted position: an elbow actuator (FIG. 8), a retraction spool (FIG. 9), a forwarding track (FIG. 7b), a pneumatic spring hinge, a motorized hinge, a push servo, a stepper motor, a telescoping suspension arm, a vertically telescoping hinge, and a vertical displacement actuator (FIG. 12a-12b). The controller 72 may communicate with and actuate the retract-fold mechanism 66. The controller may be capable of receiving input selections from at least one of a user and a speed-actuated sensor 77 detecting vehicle (CMV) speed. The processor may be configured to receive the input selections (not shown) and may be configured for controlling the controller 72 to retract or fold the streamlining elements 12.

Continuing with FIGS. 11a-11b and 13, in various embodiments, controller 72 may be a direct controller of a user directly actuating retraction or folding of the elements 12, or controller 72 may be a remote control located in the cab of the CMV 90 or within a Smartphone. A speed sensor 77 may be disposed on the CMV 90 (not shown mounted) or in a Smartphone for detecting CMV speed and/or direction for triggering retraction or folding. For example, speed sensor 77 may trigger the retracted elements 12 to fold when forward motion is detected, or when a certain speed is reached, thus allowing a driver to pull out of a loading dock and have the elements automatically secure themselves for highway travel. Or, alternately, speed sensor 77 may trigger the folded elements 12 to retract when backward motion is detected, or when speed drops below a certain threshold, thus allowing a driver to back into a loading dock and have the elements 12 automatically expose the rear end 70 for accessing cargo within the CMV 90. The control system illustrated in FIG. 13 may include position sensors 74 and/or 76 to signal to the processor 71 when an end position (retracted or folded) has been reached, and the signaling of the end position may disable further action by retract-fold mechanism 66. For example, retracted sensor 74 may indicate that one or both elements 12 are in the retracted position. Also, folded sensor 76 may indicate that one or both elements 12 are in the folded position. Position sensors 74 and 76 may also alert the user through processor 71 and controller 72 that a safe or dangerous situation has occurred.

Referring now to FIG. 12a-12c, in various embodiments, provisions may be made for thinning a streamlining element 12 in order to allow closer adjacent-vehicle parking (not shown) on a loading dock. One or more vertical displacement actuators 20 may be disposed between an upper element portion 22 and a lower element portion 24 of streamlining element 12. Airflow surface 18 may be fabricated of an elastic material for flexibly deforming to a lengthened vertical distance 29. The vertical displacement actuator 20 (FIG. 12c) may selectably lengthen a vertical distance between upper element portion 22 and lower element portion 24 when streamlining element 12 is in the retracted position, the lengthened vertical distance 29 thinning the streamlining element to a reduced side amount 28.

Continuing, in various embodiments, in FIG. 12c, two vertical displacement actuators may be utilized independent of suspension frame 30 and element hinge 34 to thin element 12. In FIG. 12a-12b, vertical displacement actuator 20 may configured as a telescoping actuator 21 mounted to each end of element hinge 34 for lengthening the vertical distance between the element portions 22 and 24. Telescoping actuators 21 may be pneumatically or electrically actuated. Alternatively, airflow surface 18 may be partitioned into two or more hinged or paneled airflow segments supported by an interior frame, where vertical displacement actuator 20 mounted to the interior frame may separate and/or fold the airflow segments to achieve the lengthened vertical distance 29 and reduced side amount 28.

In further embodiments, a larger or smaller number of suspension arms or panels may be utilized to suspend the streamlining elements 12. Alternatively, a single streamlining element 12 may be hingedly suspended from suspension frame 30 hingedly mounting to outer vertical corner 50 for forming a fairing substantially covering the left and right portions of rear end 70 and retractable along one vehicle side surface 92. In other embodiments, automated aspects of the retractable fairing 10 may be powered by at least one of the vehicle's electric system, the vehicle's hydraulic system, batteries, and/or photovoltaic panels for independently collecting power in the event the vehicle's power system fails and a CMV needs to be loaded or unloaded.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A retractable fairing for reducing aerodynamic drag at a rear end of a commercial motor vehicle (CMV), comprising:
   a streamlining element having an airflow surface with a medial edge defining an element medial plane, the airflow surface for streamlining air flowing past an aft portion of a vehicle side surface of the CMV;
   a suspension frame having an element end and a trailer end, the element end configured to hingedly support the streamlining element at approximately the element medial plane, the trailer end configured for hingedly mounting the suspension frame to approximately an outer vertical corner of the rear end and including a trailer hinge allowing the streamlining element to move in a horizontal plane into a folded position adjacent to the rear end of the CMV; and
   wherein the streamlining element is configured such that when a pair of streamlining elements of complementary shape are each mounted by a suspension frame to a respective left and right half of the rear end and are each placed in the folded position, the element medial plane of the streamlining elements face one another and the streamlining elements collectively form the retractable fairing substantially covering both the respective left and right half of the rear end so as to create a closed structure with the pair of streamlining elements of complementary shape and block the streamlining air from flowing against the rear end.

2. The retractable fairing of claim 1, further comprising:
the streamlining element including an element back plane defined by a back edge of the airflow surface; the folded position comprising the element back plane facing the rear end of the CMV.

3. The retractable fairing of claim 1, further comprising:
a retracted position in which the streamlining element is positioned adjacent to the vehicle side surface, the trailer hinge allowing the streamlining element to move between the folded position and the retracted position.

4. The retractable fairing of claim 1, wherein:
the complementary shape of the pair of streamlining elements comprises the pair of streamlining elements being mirror images of one another.

5. The retractable fairing of claim 1, wherein:
the shape of the retractable fairing in the folded position is one of half-spherical, paraboloid, conical, truncated conical, pyramidal, and truncated-pyramidal.

6. The retractable fairing of claim 1, wherein:
the streamlining element is solid.

7. The retractable fairing of claim 1, wherein:
the streamlining element is hollow.

8. The retractable fairing of claim 1, further comprising:
the CMV being a cargo trailer of a cargo-carrying truck, a rear access to the cargo trailer comprising an opposing pair of cargo doors that fold together to close the rear end.

9. The retractable fairing of claim 8, further comprising:
the trailer hinge having a trailer hinge pivot axis and being configured such that when the suspension frame is mounted to the rear end, the trailer pivot axis is approximately collinear with or outboard of a door hinge axis of the cargo door.

10. The retractable fairing of claim 1, wherein:
the suspension frame comprises a suspension forearm having the element end and the trailer end, the element end hingedly supporting the streamlining element at approximately the intersection of the element medial plane and an element back plane defined by a back edge of the airflow surface, the element back plane facing the rear end when the streamlining element is in the folded position, the streamlining element being adjacent to the vehicle side surface when in a retracted position.

11. The retractable fairing of claim 1, wherein:
the trailer hinge is configured for at least approximately 270 degrees of rotation in a horizontal plane when the streamlining element is moved between the folded position and a retracted position adjacent to the vehicle side surface.

12. The retractable fairing of claim 1, further comprising:
a retraction spool disposed on the CMV for spooling a retraction cable attached to the streamlining element for pulling the streamlining element from the folded position to a retracted position adjacent to the vehicle side surface.

13. The retractable fairing of claim 1, further comprising:
a processor, a retract-fold mechanism connected to the processor, and a controller connected to the processor, the retract-fold mechanism configured for swinging two complementary streamlining elements between a retracted position adjacent to the vehicle side surfaces and the folded position, the controller for communicating with and actuating the retract-fold mechanism, the controller capable of receiving input selections from at least one of a user and a speed-actuated sensor detecting vehicle speed, the processor configured to receive the input selections and configured for controlling the controller to retract or fold the streamlining elements.

14. The retractable fairing of claim 13, further comprising:
a position sensor communicating with the processor to augment control of the retract-fold mechanism, where the position sensor is at least one of a retracted sensor for detected the streamlining element being in a retracted position and a folded sensor for detected the streamlining element being in a folded position, the position sensor.

15. A retractable fairing for reducing aerodynamic drag at a rear end of a commercial motor vehicle (CMV), comprising:
a streamlining element having an airflow surface with a medial edge defining an element medial plane, the airflow surface for streamlining air flowing past an aft portion of a vehicle side surface of the CMV;
a suspension frame having an element end and a trailer end, the element end configured to hingedly support the streamlining element at approximately the element medial plane, the trailer end configured for hingedly mounting the suspension frame to approximately an outer vertical corner of the rear end and including a trailer hinge allowing the streamlining element to move in a horizontal plane into a folded position adjacent to the rear end of the CMV;
wherein the streamlining element is configured such that when a pair of streamlining elements of complementary shape are each mounted by a suspension frame to a respective left and right half of the rear end and are each placed in the folded position, the element medial plane of the streamlining elements face one another and the streamlining elements collectively form the retractable fairing substantially covering the rear end;
the suspension frame comprises a suspension forearm having the element end and the trailer end, the element end hingedly supporting the streamlining element at approximately the intersection of the element medial plane and an element back plane defined by a back edge of the airflow surface, the element back plane facing the rear end when the streamlining element is in the folded position, the streamlining element being adjacent to the vehicle side surface when in a retracted position; and
a forwarding track oriented horizontally along the vehicle side surface, one track end being interposed between the outer vertical corner of the CMV and the trailer hinge, the forwarding track for suspending and sliding the retracted streamlining element forward along the vehicle side surface for clearing an open cargo door configured for closing the rear end of the CMV.

16. A retractable fairing for reducing aerodynamic drag at a rear end of a commercial motor vehicle (CMV), comprising:
a streamlining element having an airflow surface with a medial edge defining an element medial plane, the airflow surface for streamlining air flowing past an aft portion of a vehicle side surface of the CMV;
a suspension frame having an element end and a trailer end, the element end configured to hingedly support the streamlining element at approximately the element medial plane, the trailer end configured for hingedly mounting the suspension frame to approximately an outer vertical corner of the rear end and including a trailer hinge allowing the streamlining element to move in a horizontal plane into a folded position adjacent to the rear end of the CMV;
wherein the streamlining element is configured such that when a pair of streamlining elements of complementary shape are each mounted by a suspension frame to a respective left and right half of the rear end and are each placed in the folded position, the element medial plane of the streamlining elements face one another and the streamlining elements collectively form the retractable fairing substantially covering the rear end;
the suspension frame comprising a suspension upper arm and a suspension forearm joined with an elbow hinge, the suspension upper arm having the trailer end and the suspension forearm having the element end, the elbow hinge cooperating when moving the streamlining element horizontally between the folded position and a retracted position adjacent to the vehicle side surface.

17. The retractable fairing of claim 16, wherein:
the suspension frame is configured to retract the streamlining element forward from the outer vertical corner by approximately a sum of a suspension upper arm length and a suspension forearm length for clearing an open cargo door configured for closing the rear end of the CMV.

18. The retractable fairing of claim 16, wherein:
the elbow hinge is configured for at least approximately 90 degrees of rotation in a horizontal plane during movement between the folded and the retracted positions.

19. The retractable fairing of claim 16, further comprising:
an elbow actuator attached between the suspension upper arm and the suspension forearm for at least one of retracting the streamlining element and folding the streamlining element.

20. The retractable fairing of claim 16, further comprising:
the element end including an element hinge configured to allow the streamlining element to rotate approximately 180 degrees in a horizontal plane during movement between the folded position and the retracted position.

21. A retractable fairing for reducing aerodynamic drag at a rear end of a commercial motor vehicle (CMV), comprising:
a streamlining element having an airflow surface with a medial edge defining an element medial plane, the airflow surface for streamlining air flowing past an aft portion of a vehicle side surface of the CMV;
a suspension frame having an element end and a trailer end, the element end configured to hingedly support the streamlining element at approximately the element medial plane, the trailer end configured for hingedly mounting the suspension frame to approximately an outer vertical corner of the rear end and including a trailer hinge allowing the streamlining element to move in a horizontal plane into a folded position adjacent to the rear end of the CMV;
wherein the streamlining element is configured such that when a pair of streamlining elements of complementary shape are each mounted by a suspension frame to a respective left and right half of the rear end and are each placed in the folded position, the element medial plane of the streamlining elements face one another and the streamlining elements collectively form the retractable fairing substantially covering the rear end;
a vertical displacement actuator disposed between an upper element portion and a lower element portion of the streamlining element, the airflow surface being flexibly deformable for extending beyond the vehicle side surface by a reduced side amount, where the vertical displacement actuator is configured for selectably lengthening a vertical distance between the upper element portion and the lower element portion when the streamlining element is in a retracted position adjacent to the vehicle side surface, the lengthened vertical distance thinning the streamlining element to the reduced side amount for maximizing clearance on a loading dock.

22. The retractable fairing of claim 21, wherein:
where the vertical displacement actuator comprises a telescoping actuator mounted to each end of the element hinge suspending the streamlining element, the telescoping actuators being pneumatically operated for lengthening the vertical distance between the upper and the lower element portions.

23. The retractable fairing of claim 21, wherein:
the flexibly deformable airflow surface is made of an elastic material assuming the reduced side amount in response to the lengthened vertical distance.

24. A retractable fairing for reducing aerodynamic drag at a rear end of a commercial motor vehicle (CMV), comprising:
a streamlining element having an airflow surface with a medial edge defining an element medial plane, the airflow surface for streamlining air flowing past an aft portion of a vehicle side surface of the CMV;
a suspension frame having an element end and a trailer end, the element end configured to hingedly support the streamlining element at approximately the element medial plane, the trailer end configured for hingedly mounting the suspension frame to approximately an outer vertical corner of the rear end and including a trailer hinge allowing the streamlining element to move in a horizontal plane into a folded position adjacent to the rear end of the CMV;
wherein the streamlining element is configured such that when a pair of streamlining elements of complementary shape are each mounted by a suspension frame to a respective left and right half of the rear end and are each placed in the folded position, the element medial plane of the streamlining elements face one another and the streamlining elements collectively form the retractable fairing substantially covering the rear end;
one or more latches for at least one of latching the right and left streamlining element together, latching the streamlining element to the rear end when in the folded position, latching the streamlining element to the vehicle side surface in a retracted position.

* * * * *

UNITED STATES PATENT AND TRADEMARK OFFICE
CERTIFICATE OF CORRECTION

PATENT NO.      : 9,688,319 B2                                    Page 1 of 1
APPLICATION NO. : 14/872883
DATED           : June 27, 2017
INVENTOR(S)     : David W. Traylor It is certified that error appears in the above-identified patent and that said Letters Patent is hereby corrected as shown below:

On the Title Page

In the title, "COMMERICAL" should read --COMMERCIAL--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*